Oct. 13, 1936.　　　　　E. T. MEEHAN　　　　　2,057,043
ATTACHING MEANS FOR TUBE MACHINE CLOSURES
Filed Sept. 29, 1934　　　3 Sheets-Sheet 1
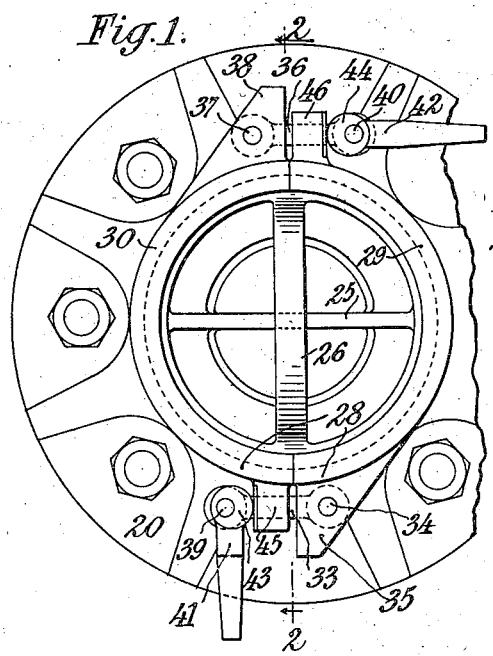
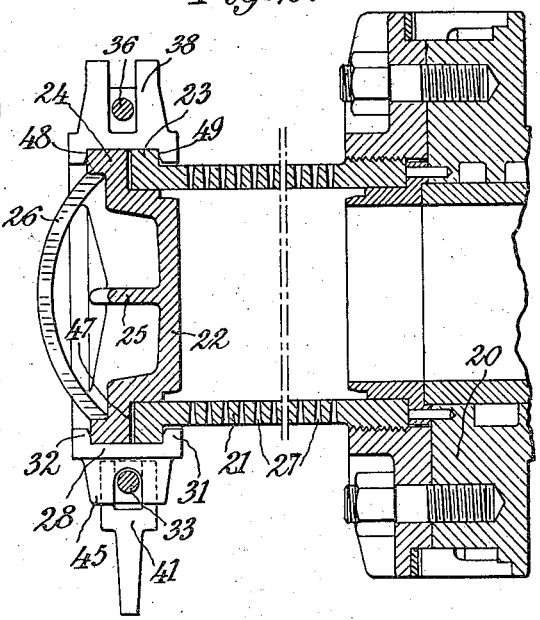
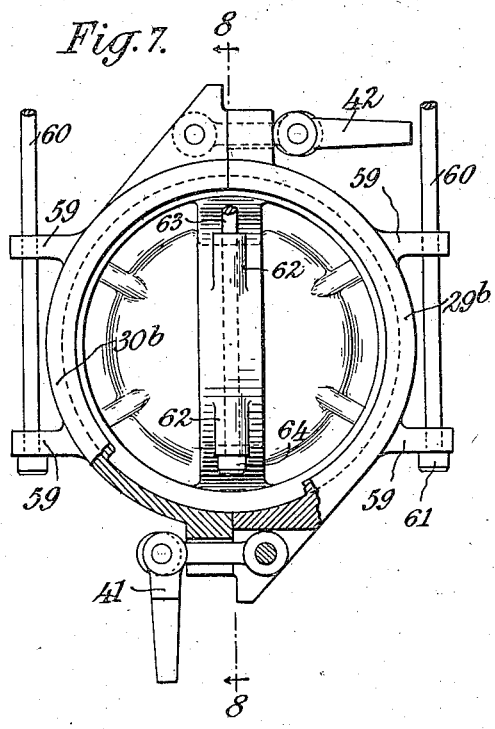
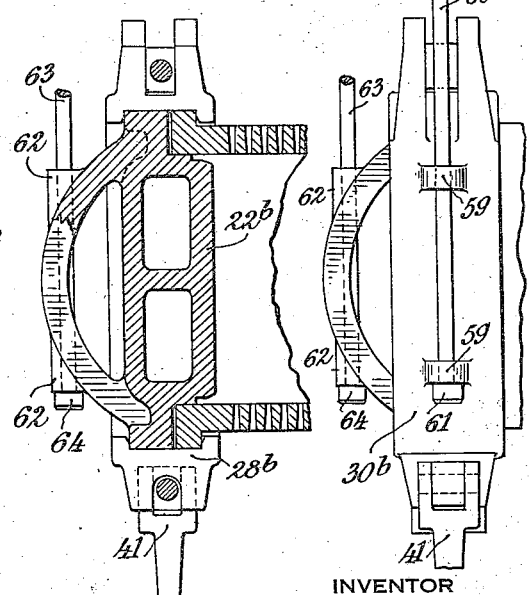
INVENTOR
*Earl T. Meehan,*
BY *Fraser, Myers & Manley,*
ATTORNEYS.

Oct. 13, 1936.　　　　E. T. MEEHAN　　　　2,057,043
ATTACHING MEANS FOR TUBE MACHINE CLOSURES
Filed Sept. 29, 1934　　　3 Sheets-Sheet 2
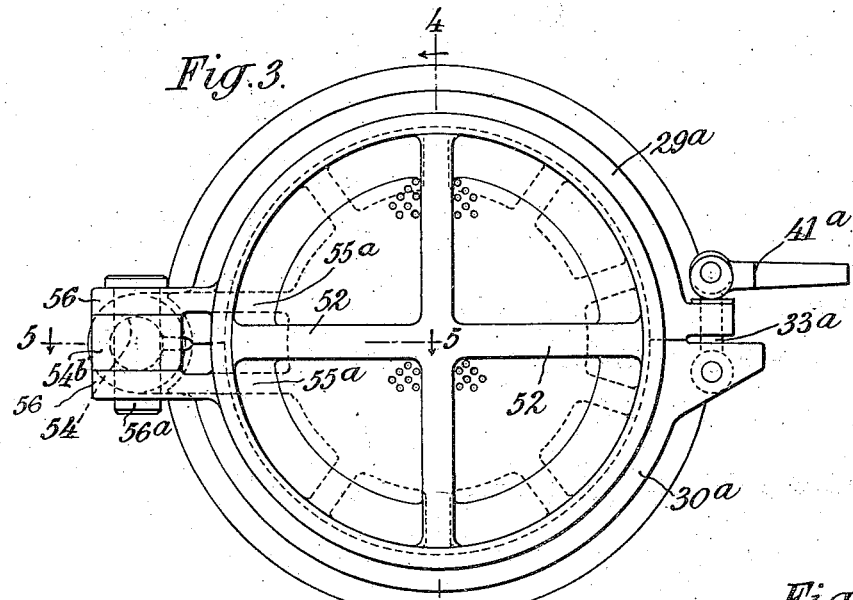
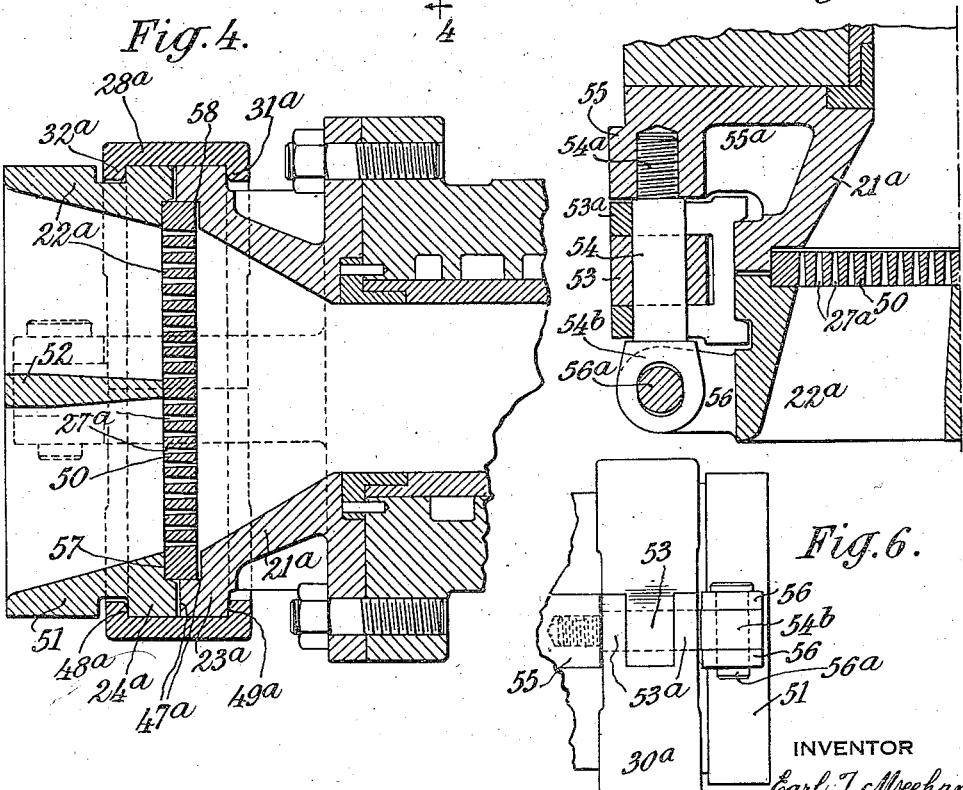
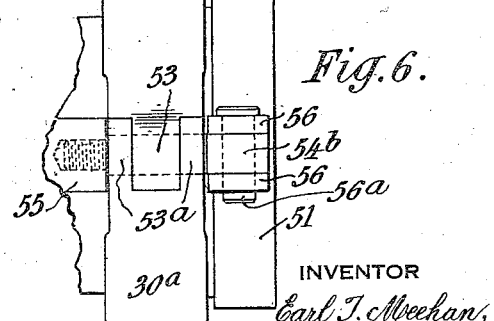
INVENTOR
Earl T. Meehan,
BY
Fraser, Myers & Manley,
ATTORNEYS.

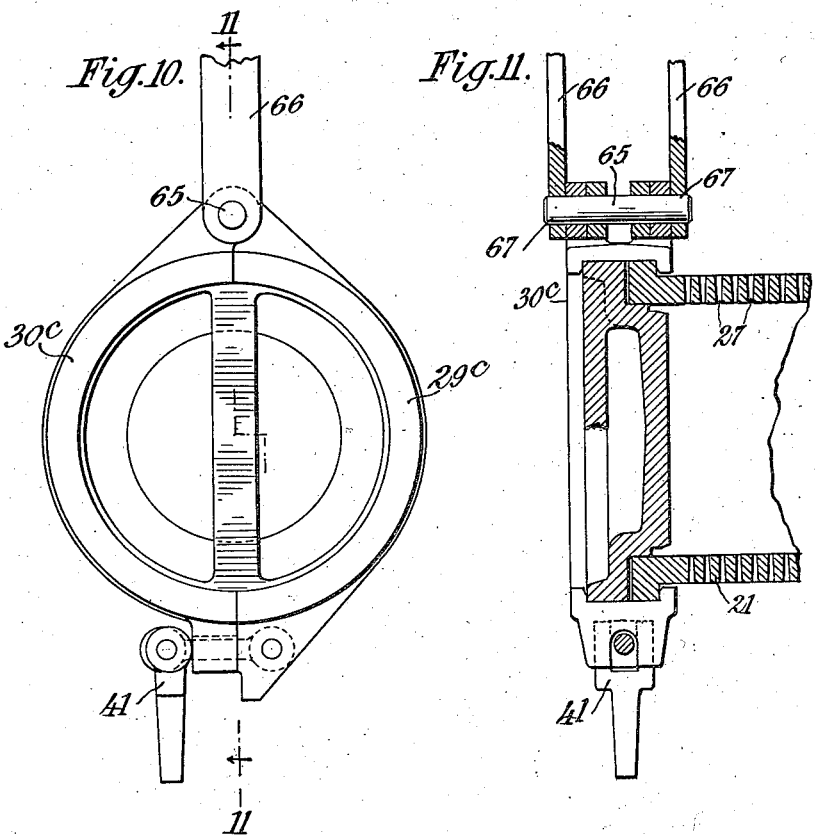

Patented Oct. 13, 1936

2,057,043

UNITED STATES PATENT OFFICE 2,057,043

ATTACHING MEANS FOR TUBE MACHINE CLOSURES

Earl T. Meehan, Shelton, Conn., assignor to Farrel-Birmingham Company, Incorporated, Ansonia, Conn., a corporation of Connecticut Application September 29, 1934, Serial No. 746,260

12 Claims. (Cl. 146—174)

This invention relates to improvements in tube machines adapted for use in making tubing and analogous articles, and in straining, cleaning, refining, reclaiming or otherwise working rubber and analogous plastic materials. As herein disclosed the invention is illustrated and described as applied to a machine having a head and closure adapted for use in forcing rubber through a screen backed up by an enclosing wall provided with a plurality of small openings, and when so equipped the machine may be properly referred to as a strainer; but the invention is equally applicable to tubing machines generally having heads and closures adapted for any purposes for which such machines are capable of being used, the heads or closures, or both, being readily interchangeable to prepare the machine for the desired use.

Strainers of the above-designated character usually comprise a cylinder, a hopper by which plastic material may be fed into the cylinder, and a feed-screw or equivalent device by means of which plastic material may be forcibly fed from the cylinder into the strainer head commonly connected to one end of the cylinder, the strainer head comprising an annulus, which may be of cylindrical, conical, or other appropriate form, having firmly secured at its end a cap, plug or other closure. Either the annulus or the closure, or both, may be perforated to provide for the escape of the plastic material which is forced from the cylinder into the strainer head, and a suitable screen or screens may be so positioned in the strainer head that the plastic material must be forced through the screen or screens before it can be expelled from the strainer head through the perforations. The invention is directed particularly to a satisfactory means of securing the cap, plug, head, disk, or other type of end plate or stopper relied upon to serve as a closure for the conical, cylindrical, or other tubular element of a strainer of the character described or of a tube machine generally.

It is an object of the invention to provide a simple and inexpensive attaching means whereby the closure may be quickly and easily secured to and separated from the annulus, the relation of the annulus, closure and closure-connecting means being such that the joints between said parts will be self-sealing to an extent such as to prevent the escape of any appreciable amount of plastic material, other than through the perforations in the strainer, without the necessity of resorting to the use of gaskets or other packing means.

It is a further object of the invention to provide suitable means for suspending or otherwise supporting the closure-fastening means, and, if desired, the closure as well as the fastening means, in such manner that they may be disconnected and readily assembled with and disassembled from the annulus without making it necessary for the operative to bear the weight of the disassembled parts.

In the accompanying drawings illustrating the preferred and modified forms of the invention:—

Figure 1 is an end view of one form of strainer embodying the above-described invention.

Fig. 2 is a view in vertical, longitudinal section of a portion of the strainer illustrated by Fig 1, the section being taken along a plane represented by the line 2—2 of Fig. 1 and the parts being viewed in the direction indicated by the arrows.

Fig. 3 is an end view of a modified form of strainer having the invention applied thereto.

Fig. 4 is a view in vertical, longitudinal section through parts of the strainer illustrated by Fig. 3, the section being taken along the plane represented by the line 4—4 and the parts being viewed in the direction indicated by the arrows.

Fig. 5 is a sectional view of a part of the strainer illustrated by Figs. 3 and 4, the section being taken along the plane represented by the line 5—5 of Fig. 3 and the parts being viewed in the direction indicated by the arrows.

Fig. 6 is a side view of the portion of the strainer illustrated at the left side of Fig. 3 and at the lower left side of Fig. 5, drawn to a smaller scale.

Fig. 7 is an end view of a second modified form of strainer having the foregoing invention embodied therein.

Fig. 8 is a view in vertical, longitudinal section of the strainer illustrated by Fig. 7, the section being taken along the plane represented by the line 8—8 and the parts being viewed in the direction indicated by the arrows.

Fig. 9 is a side view of the closed end of the strainer illustrated by Fig. 7 as viewed from the right.

Fig. 10 is an end view of a third modified form of strainer to which the invention may be applied.

Fig. 11 is a vertical, transverse, sectional view through the strainer illustrated by Fig. 10, the section being taken along the plane represented by the line 11—11, the parts being viewed in the direction indicated by the arrows.

The invention as illustrated by Figs. 1 and 2 may be applied to a strainer comprising the usual cylinder a portion of which is indicated at 20, to the end of which may be secured in any appropriate manner a strainer head, which, in the form selected for purposes of illustration, comprises an annulus 21 of cylindrical form and a closure in the form of a circular cap or plug 22.

The screw or other appropriate means by which plastic material may be forcibly fed from the cylinder into the space within the strainer head, and the screen or screens which may be used within the strainer head, constitute no part of the invention to be claimed in this application and are not disclosed.

In the form of the invention illustrated by Figs. 1 and 2 the annulus 21 at its free end is provided with an external flange 23, and the closure 22 is provided with a peripheral portion 24 of the same diameter as that of the flange 23. The closure may be strengthened by appropriately positioned ribs 25, one of which, 26, may be of a form such as to serve as a handle adapted to facilitate the assembling and disassembling of the closure with and from the annulus.

The annulus 21 may be provided with the usual perforations 27 to allow for the escape of plastic material from the strainer head.

The means for quickly and easily connecting and disconnecting the closure and annulus may comprise a sectional coupling ring 28, which may consist of a pair of semi-circular segments 29, 30. This ring 28 may, as best indicated in Fig. 2, have a pair of internally disposed flanges 31, 32, the size of the ring and the spacing of the flanges being such that the flange 23 of the annulus and the peripheral portion 24 of the closure may extend into the channel between the flanges of the coupling ring, the combined thickness of the parts 23 and 24 as compared with the spacing of the flanges 31, 32 being such as to afford a free and easy working clearance.

Any suitable means may be provided for readily attaching and detaching the parts of the coupling ring 28. A satisfactory form illustrated in Figs. 1 and 2 comprises a pair of clamps of the link and cam lever type, one such clamp being used for each pair of adjacent ends of the segments of the coupling ring. The links and levers may, if desired, be connected with the opposite ends of the segments in alternation, so that the link 33 of one clamp may be pivotally connected, as at 34, between a pair of spaced lugs 35 extended from one end of the segment 29, and the link 36 of the other clamp may be pivotally connected, as at 37, between a pair of lugs 38 extended from the opposite end of the segment 30. The links 33 and 36 may be pivotally connected, as at 39 and 40, with cam levers 41, 42, respectively, having cams 43, 44 so positioned that they may be rotated into a frictional holding engagement with lugs 45, 46 extended from adjacent end portions of the segments 30 and 29, respectively.

In order that they may be most effective, the cam elements 43 and 44 will be so positioned with respect to the handles of the levers 41, 42 that, as best indicated in Fig. 1, the handle of lever 42 will be substantially horizontal and the handle of lever 41 in a substantially vertical or dependent position when the cams are in their effective holding position, so that the handle of each lever will have to be raised against the opposing force of gravity in order to release it and so that the force of gravity will always have a tendency to turn each lever towards its effective holding position and to maintain it there.

In view of the free working clearance provided for between the interengaging portions of the flange on the annulus, the closure and the coupling ring, as indicated by the space at 47 between the opposed surface portions of the annulus and closure, the two segments 29, 30 may be very easily and quickly slipped together over the peripheral portion of the closure and the flange on the annulus and firmly secured to each other by rotating the links 33, 36 to the positions indicated in Fig. 1, and then turning the levers 41, 42 to positions such as to render the cams 43, 44 effective. After the parts have been thus assembled and plastic material is forcibly fed into the strainer head, the resulting pressure against the inner surface of the closure 22 will tend to move the closure outwardly, and this will, in turn, tend to move the coupling ring 28 outwardly so that the closure and the coupling ring will be held in close contact with each other along the opposed surfaces indicated at 48 in Fig. 2 and the annulus and the coupling ring will be held in close contact along the surfaces indicated at 49 in Fig. 2. It will be apparent that by machining these contacting portions of the structure to true plane surfaces, the joints between the assembled parts of the strainer will be practically self-sealing, thus eliminating the necessity of resorting to the use of gaskets or other packings.

The strainer head may be opened, when desired, by turning the cam levers 41, 42 to their releasing positions and rotating the links 33, 36 out of their engaging relations with the lugs 45, 46, after which the segments 29, 30 may be separated, so as to permit the closure 22 to be removed from the end of the annulus, by first tapping one of the lugs 35, 38 to loosen it and thus permit it to be removed and by subsequently tapping either of the two lugs of the other segment to loosen it and permit it to be removed. By reversing the operation the parts may be as readily assembled.

It will be seen that the closure-attaching means embodying the invention makes it possible to disassemble the parts of the strainer head for purposes of cleaning or changing the screens to be used with the greatest expedition and economy of time and labor.

In the form of the invention illustrated by Figs. 3 to 6, inclusive, the annulus 21ᵃ is conical or of a flaring tubular form, rather than cylindrical, but is provided with an external flange 23ᵃ at its open end, similar to the flange 23 illustrated in Fig. 2. The closure 22ᵃ of this form of the invention is made in two parts and comprises a circular disk 50 and a retaining ring 51, which may be provided with any desired number of radially disposed ribs 52 to serve as reinforcements for the disk 50.

In this form of the invention the perforations 27ᵃ of the strainer head may be in the disk 50, rather than in the annulus 21ᵃ.

As best illustrated by Figs. 3, 5 and 6, the coupling ring may comprise two segments 29ᵃ and 30ᵃ, which may be hinged by means of knuckles 53, 53ᵃ to a hinge pin 54, secured in any appropriate manner, as by a threaded connection 54ᵃ, in a supporting lug 55 in the adjacent marginal portion of the annulus 21ᵃ, the lug being reinforced, if desired, by ribs 55ᵃ. The ring 51 of the closure may also, if desired, be supported by and have a swinging connection with the annulus. The ring may, for example, be provided with laterally extended lugs or knuckles 56 having pivotal connections with the head 54ᵇ of the hinge pin 54 by a second hinge pin 56ᵃ.

The adjacent ends of the segments 29ª, 30ª, opposite their pivoted ends, may be detachably secured to each other by a link 33ª and cam lever 41ª, in every respect similar to the clamp of the swinging link and cam lever type illustrated at the lower side of Figs. 1 and 2.

The retaining ring 51 may be provided with an externally disposed flange 24ª to serve the function of the peripheral portion 24 of the closure illustrated in Fig. 2, and the coupling ring 28ª comprising the segments 29ª, 30ª may have internally disposed, spaced flanges 31ª, 32ª, the proportion and spacing of the interengaging parts of the coupling ring, closure and annulus being identical with the corresponding parts of the device illustrated by Figs. 1 and 2, so that such parts may be readily disassembled by releasing the clamping device 33ª, 41ª, and swinging the segments 29ª, 30ª about their pivoted connection with the hinge pin 54, after which the retaining ring 51 may be swung open about its pivoted connection with the hinge pin 56ª, and the head 50 removed.

As clearly indicated in Fig. 4, the thicknesses of the disk 50 and flanges 23ª, 24ª, as compared with the spacing of the flanges 31ª, 32ª, are such as to provide a free and easy clearance between all of said parts, as clearly indicated by the spaces between the lines representing opposed surfaces as at 47ª.

The connections between the head 50, the ring 51, the ring 28ª and the annulus should be such that they may adjust themselves during the operations of the machine so as to be self-sealing in the manner explained in describing the form of the invention illustrated by Figs. 1 and 2. To this end the openings in the hinge lugs 56 for the hinge pin 56ª, or the opening in the head 54ᵇ, or both, may be slightly oblong in cross section, as indicated in Fig. 5, and slight clearances may be allowed between the surfaces of the hinge knuckles 53ª and the opposed surfaces of the lug 55 and head 54ᵇ of the hinge pin 54, so that when the parts are assembled and plastic material is fed forcibly into the strainer head in order to pass it through the enclosed screens (not shown) and the perforations 27ª of the disk 50, the relatively great pressure against the disk 50 may press it forcibly against the retaining ring 51, which will likewise be pressed outwardly against the flanges 32ª of the coupling ring 28ª, which, in turn, will be pressed into forcible engagement with the rear surface of the flange 23ª of the annulus. The contacting parts of the mechanism at 48ª, 49ª and 57, which should be machined to true plane forms, will therefore be held in snug contact with each other and render the device self-sealing.

It has already been explained how the parts of the device may be readily disassembled. They may be reassembled, with equal facility, by positioning the disk 50 with its peripheral portion in the recess 58 in the end of the annulus and then swinging the retaining ring 51 and segments 29ª, 30ª of the coupling ring 28ª about their hinged joints to their closed positions, as indicated in Fig. 3, and securing the ends of the segments together by means of the clamping device 33ª, 41ª.

The hinged joints by means of which the retaining ring and the segments of the coupling ring are connected with the annulus afford a satisfactory means of supporting the rings when disassembled, thus relieving the operative of the burden of lifting them.

The modified form of the invention illustrated by Figs. 7, 8 and 9 differs essentially from the form illustrated by Figs. 1 and 2 in that means is provided whereby the parts of the coupling ring 28ᵇ and the closure 22ᵇ may be suspended from, or otherwise held by, any convenient means of support, so that the parts of the device when being assembled and disassembled may be moved into and out of their engaging relations without having to be lifted. One satisfactory means of support which has been selected for purposes of illustration may comprise pairs of lugs 59 extending laterally from each of the ring segments 29ᵇ, 30ᵇ and a rod 60 suspended from any available support above the strainer and having a head 61 in engagement with the under surface of the lower lug 59. In like manner the closure may be provided with lugs 62 and supported by a rod 63 suspended from any available means of support above the strainer, the suspension rod being passed through the lugs 62 and having a head 64 in engagement with the lower lug. The suspension rods may be so adjusted that they will hold the closure and the ring segments at their proper elevations to be moved into and out of the relative positions in which they are intended to be assembled, so that the closure may be readily separated from the annulus by merely releasing the clamping devices 41, 42, separating the ring segments 29ᵇ, 30ᵇ, and drawing the closure 22ᵇ outwardly. The suspension rods 60 and 63 may be sufficiently flexible to permit the parts of the disassembled device to be freely moved away from each other.

The flexible rods 60, 63, used as a means of support for the closure and its clamping ring, will in no manner interfere with the relative movement of the parts of the assembled device when pressure is exerted by plastic material against the inner face of the closure, which is relied upon to make the joints self-sealing, as has been fully explained in connection with the description of the forms of strainer illustrated by Figs. 1 to 6, inclusive.

The closure illustrated by Fig. 8 is of a form somewhat different from that illustrated by Fig. 2, but all other parts of the strainer construction illustrated by Figs. 7, 8 and 9 which have not been specifically mentioned are substantially identical with corresponding parts of the construction illustrated by Figs. 1 and 2, and need not be specifically referred to.

The form of the invention illustrated by Figs. 10 and 11 differs from any of those hereinbefore described in that the segments 29ᶜ, 30ᶜ of the coupling ring are connected with each other by a hinged joint, as at 65, and the coupled segments are represented as being connected with a pair of links 66 by means of hinged joints 67, the axes of which are in alignment with the axis of the hinged joint 65. The links 66 may be connected with any available means of support. In the form illustrated, the segments are represented as being suspended by the links 66 from a support at some point above the strainer. The free ends of the ring segments may be detachably secured together by means of any suitable clamping device, the one represented in Figs. 10 and 11 of the drawings being identical with the one shown at the bottom of Fig. 1. The closure illustrated by Figs. 10 and 11 is of a form somewhat different from any of those disclosed in other figures of the drawings but in other respects parts of the strainer construction illustrated by Figs. 10 and 11 which have not been specifically referred to are identical with corresponding parts of the construction illustrated by Figs. 1 and 2 and therefore call for no further consideration.

In Figs. 3 to 11, inclusive, illustrating modified forms of the invention, no attempt has been made to illustrate the screens used in the strainer head or the feed-screw by means of which plastic material is forced into and through the perforations in the strainer head. In this respect the illustration of the modifications conforms with the illustration of the form shown in Figs. 1 and 2.

It will be apparent that a closure-fastening device of any form embodying the herein disclosed invention affords a very satisfactory means whereby the closure may be easily and quickly removed from the open end of the strainer head in order to clean out the strainer or to change or renew a screen, and as quickly restored to its effective closing position.

The term "tube machine" as used in this specification and in the appended claims is intended to be given the broad interpretation with which it is commonly used in the art relating to the extrusion of rubber and similar plastic materials, rather than the limited interpretation which is suggested by use of the word "tube". Such machines were originally used in the making of tubing, but by substituting heads having orifices therein to serve as dies of different configurations have been adapted for use in extruding plastic material in the form of strips of any desired cross-sectional shape. The specification and claims of this application are intended to be of a scope such as to include the disclosed invention as applied to any extruding machine having a cap, plug or other closure to be detachably attached to a flanged annulus, irrespective of the cross-sectional shape of the extruded material. The term "tube machine", rather than extruding machine, has been used merely because it has been retained in the rubber working industry as a name for just such machines.

The invention is not intended to be limited to any of the forms herein selected for purposes of illustration, but should be regarded as including modifications and variations thereof within the scope of the appended claims.

What is claimed is:

1. A self-sealing tube machine comprising an annulus having a continuous, external flange on one end, a closure for the flanged end of the annulus, a sectional coupling ring having spaced, continuous, internal flanges extending the entire length of each section, said ring surrounding the flanged end of the annulus and the peripheral portion of the closure, the size of the ring and the spacing of its flanges being such that the flange on the annulus and the peripheral portion of the closure may extend into the annular channel between the flanges of the ring and leave a free and unobstructed working clearance between the end flange of the annulus and the peripheral portion of the closure during the operation of the machine, the end portions of the coupling ring sections and their flanges being clamped in close sealing contact with one another, and readily releasable fastening means for the ring sections whereby they may be rigidly held in their assembled relation and serve as an effective securing means for the closure or be released at will and permitted to separate to an extent such as to permit the closure to be removed from the end of the annulus.

2. A tube machine, as defined by claim 1, of which the annulus has a perforated wall adapted to serve as part of a strainer.

3. A tube machine, as defined by claim 1, of which the closure comprises a perforated disk adapted to serve as part of a strainer and a retaining ring extending inwardly over the peripheral portion of the disk and outwardly into the channel of the sectional coupling ring.

4. A tube machine, as defined by claim 1, of which the fastening means for the sections of the coupling ring includes a detachable clamp of the swinging link and cam lever type.

5. A tube machine, as defined by claim 1, of which the ring sections comprise a pair of semi-circular segments, and of which the fastening means for the sections comprises clamping elements of the link and cam lever type for each of the two pairs of adjacent segment ends.

6. A tube machine, as defined by claim 1, of which the ring sections comprise a pair of semi-circular segments, and of which the fastening means for the sections comprises clamping elements of the link and cam lever type for each of the two pairs of adjacent segment ends, the relative positions of the clamping cams on the two levers being such that the force of gravity will tend to hold each of them in its clamping position.

7. A tube machine, as defined by claim 1, having supporting connections between the sections of the coupling ring and the annulus comprising a loose jointed construction adapted to permit the sections to have a limited movement of translation in the direction of the axis of the annulus while closed and fastened about the flange of the annulus and the peripheral part of the closure, the connections including hinged joints adapted to permit the sections, when unfastened, to be swung to positions such as to release the flange and closure.

8. A tube machine, as defined by claim 1, having a supporting connection between the closure and the annulus comprising a loose jointed hinge adapted to permit the closure to have a limited movement of translation in the direction of the axis of the annulus while coupled with the flange of the annulus by the coupling ring and to be swung into and out of contact with the end of the annulus when released by the coupling ring.

9. A tube machine, as defined by claim 1, of which the ring sections comprise two semi-circular segments, and of which the fastening means comprises a hinged joint between two adjacent ends of the segments and a detachable clamping means for their free ends.

10. A tube machine, as defined by claim 1, of which the ring sections comprise two semi-circular segments, and of which the fastening means comprises a hinged joint between two adjacent ends of the segments and a detachable clamping means for their free ends, the segments being connected with any appropriate means of support by hinged joints having axes aligned with the axis of the joint between the segments, and the connected segments and their supporting means being of a construction such as to at least admit of a limited degree of movement of the segments in a direction parallel to the axes of the hinged joints.

11. A tube machine, as defined by claim 1, of which the ring sections comprise two semi-circular segments having their ends substantially at the top and bottom of the ring, each segment being provided with means whereby it may be supported when disassembled, the supporting means being such as to provide for a limited degree of movement in the direction of the axis of the annulus when the segments are assembled and a limited degree of movement of the segments towards and away from each other when disassembled.

12. A tube machine, as defined by claim 1, having means for supporting the closure when the closure and ring sections are disassembled, the supporting means being such as to provide for a limited degree of movement of the closure in the direction of the axis of the annulus.

EARL T. MEEHAN.